United States Patent
Kim et al.

(10) Patent No.: US 6,386,346 B1
(45) Date of Patent: May 14, 2002

(54) BRAKE VALVE DEVICE FOR INDUSTRIAL VEHICLES

(75) Inventors: Tae Kyung Kim, Incheon; Dal Sik Jang, Seoul; Jeong Hee Hong, Incheon; Sung Ha Park, Seoul, all of (KR)

(73) Assignee: Daewoo Heavy Industries Ltd., Incheon (KR)

( * ) Notice: Subject to any disclaimer, the term of this patent is extended or adjusted under 35 U.S.C. 154(b) by 0 days.

(21) Appl. No.: 09/476,070

(22) Filed: Dec. 30, 1999

(30) Foreign Application Priority Data

Dec. 31, 1998 (KR) .............................................. 98-63359

(51) Int. Cl.$^7$ ................................................. B60T 8/44
(52) U.S. Cl. .......................... 188/359; 91/431; 60/401; 60/462
(58) Field of Search ................................ 188/358, 359; 303/117.1, 114.1; 60/548, 592, 593, 470, 401, 402, 435, 437, 462; 91/431

(56) References Cited

U.S. PATENT DOCUMENTS

| | | | | |
|---|---|---|---|---|
| 3,050,944 A | * | 8/1962 | Schwartz et al. | 60/548 |
| 3,119,235 A | * | 1/1964 | Lewis et al. | 60/548 |
| 3,159,974 A | * | 12/1964 | Rodgers | 60/548 |
| 3,638,426 A | * | 2/1972 | Belart | 60/54.6 P |
| 3,774,736 A | * | 11/1973 | Ito et al. | 192/4 A |
| 4,007,593 A | * | 2/1977 | Baker | 60/548 |
| 4,028,891 A | * | 6/1977 | Belart | 60/550 |
| 4,440,454 A | * | 4/1984 | Belart et al. | 303/114 |
| 4,660,381 A | * | 4/1987 | Kuromitu | 60/548 |
| 4,834,467 A | * | 5/1989 | Zirps | 303/114 |
| 5,031,968 A | * | 7/1991 | Takata | 303/15 |

* cited by examiner

Primary Examiner—Pam Rodriguez
Assistant Examiner—Bradley King
(74) Attorney, Agent, or Firm—Staas & Halsey LLP

(57) ABSTRACT

A spool-out type booster brake valve device for industrial vehicles is configured to allow hydraulic working fluid to be supplied not only to a booster chamber but also to a master chamber thereby eliminating the need to use a separate brake fluid reservoir tank for supplementing brake fluid in the master chamber. The brake valve device is used in an industrial vehicle equipped with a fluid pump, a reservoir tank and a brake actuator. The brake valve device includes a valve body having an inlet port, a drain port, a brake port, a booster chamber communicatable with the pump via the inlet port and a master chamber communicatable with the brake actuator via the brake port. The master chamber is connected to the inlet port to receive working fluid from the pump. A valve spool is slidably fitted in the valve body through the booster chamber and the master chamber, the valve spool being shifted between an idle position and an operating position. The brake valve device also includes a booster sleeve and a master piston which are moved along with the valve spool in response to the shifting movement of the valve spool into the operating position, thereby reducing the volume of the master chamber so that the fluid in the master chamber can be introduced into the brake actuator via the brake port.

9 Claims, 11 Drawing Sheets

BRAKE VALVE DEVICE FOR INDUSTRIAL VEHICLES

FIELD OF THE INVENTION

The present invention relates generally to a brake valve device for use in industrial vehicles, and more particularly to a spool-out type booster brake valve device in which a valve spool is upwardly moved in accordance with the depression of a brake pedal, thereby causing high pressure working fluid to be introduced into a booster chamber to forcibly extend a master piston so that a brake fluid existing in a master chamber can be discharged under pressure into a brake actuator.

DESCRIPTION OF THE PRIOR ART

Generally, industrial vehicles such as forklift trucks are equipped with a pump for discharging high pressure working fluid. The working fluid discharged from the pump is supplied to a steering system, a brake system, and a variety of working implements so that it can be used as a power source for desired tasks to be conducted. The brake system typically includes a pedal adapted to be depressed by the foot of a user, a brake actuator adapted to apply a brake force to the wheels of a vehicle, and a brake valve device adapted to feed a brake fluid under pressure to the brake actuator in response to the depression of the pedal, thereby causing the brake actuator to conduct its braking function. The brake valve device may be either of a booster type in which the hydraulic force of the working fluid is used to force the brake fluid under pressure to the brake actuator, or a non-booster type in which only the depression force of the pedal is relied upon to direct the brake fluid to the brake actuator. The brake valve device may also be of a spool-in type in which a spool incorporated in the brake valve device is inwardly moved in accordance with the depression of the pedal, or a spool-out type in which the spool is outwardly moved in accordance with the depression of the pedal.

Referring to FIG. 1, a conventional brake valve device is illustrated which is of a spool-in booster type. As shown in FIG. 1, this brake valve device includes a valve body 10 which is defined with a booster chamber 12 and a master chamber 14. The booster chamber 12 is selectively connected to a pump 18 through a working fluid inlet 16 or to a reservoir tank 22 through a working fluid outlet 20. A valve spool 24 is slidably arranged in the valve body 10 in such a fashion that it can be shifted between an idle position and an operating position thereof. The valve spool 24 is normally biased toward the idle position by a return spring 24a. When the valve spool 24 is at its idle position, as shown in FIG. 1, the booster chamber 12 is shut off from the pump 18 while communicating with the reservoir tank 22. In this state, accordingly, no pressure is applied to the booster chamber 12. As the valve spool 24 is moved from its idle position to its operating position in accordance with the depression of a brake pedal 26, the pump 18 is connected to the booster chamber 12 so that high pressure working fluid can be supplied to the booster chamber 12. A pressure reducing valve 28 is arranged between the working fluid inlet 16 of the valve body 10 and the pump 18. The pressure reducing valve 28 serves to reduce the pressure of the working fluid supplied to the booster chamber 12 to a predetermined level or less.

In the meantime, the master chamber 14 of the valve body 10 is connected to a brake actuator 32 via a backflow control valve 30 while being connected to the valve spool 24 via a pilot line 34. The master chamber 14 also communicates with a brake fluid reservoir tank 36 to receive a brake fluid from the reservoir tank 36. A booster piston 38 and a master piston 40 are slidably received in the booster chamber 12 and the master chamber 14, respectively. These pistons 38 and 40 are connected to each other by means of a connecting rod 42 so that they can move as a unit. The booster piston 38 and the master piston 40 are always biased toward their retracted positions by return springs 38a and 40a, respectively. When the driver of a vehicle, to which the brake valve device is applied, depresses the brake pedal 26 to shift the valve spool 24 from the idle position to the operating position, the pump 18 is rendered to communicate with the booster chamber 12 to feed high pressure working fluid to the booster chamber 12. As a result, both the booster piston 38 and the master piston 40 are extended against the return springs 38a and 40a by a distance proportional to the displacement of the valve spool 24, thus causing the brake fluid in the master chamber 14 to be fed under pressure to the brake actuator 32 which in turn applies brake force to vehicle wheels.

On the contrary, when the depression force 26 is removed from the brake pedal, the valve spool 24 returns to its idle position by virtue of the biasing force of the return spring 24a. This allows the working fluid in the booster chamber 12 to be discharged to the reservoir tank 22. At this time, the booster piston 38 and the master piston 40 are moved to their retracted positions by virtue of the urging force of the return springs 38a and 40a, respectively, whereby the brake fluid is returned back to the master chamber 14 from the brake actuator 32 to make the latter inoperative.

In the case of the above mentioned spool-in type booster brake valve device, it is necessary to use an independent brake fluid reservoir tank for storage of brake fluid to be supplemented in the master chamber, as well as a pressure reducing valve for decreasing the pressure of the working fluid to be supplied to the booster chamber. Use of such elements tends to make the brake valve device complicated in structure and costly to manufacture. Moreover, it is unavoidable to replace overall link mechanism with a new one when an attempt is made to retrofit the existing spool-out type brake valve devices through the use of the spool-in type valve device referred to supra.

SUMMARY OF THE INVENTION

With the above-identified problems in mind, it is an object of the invention to provide a brake valve device for industrial vehicles capable of allowing pump-discharged working fluid to be used as a brake fluid, thereby eliminating the need to use a separate brake fluid fill-up unit.

Another object of the invention is to provide a brake valve device for industrial vehicles that permits pump-discharged working fluid to be supplied to a booster chamber without any pressure reduction thereof, thereby avoiding the use of a pressure reducing valve.

A further object of the invention is to provide a brake valve device for industrial vehicles which can be advantageously used in retrofitting existing spool-out type booster brake devices.

In accordance with the present invention, there is provided a brake valve device for use in industrial vehicles equipped with a fluid pump, a reservoir tank and a brake actuator, comprising: a valve body having an inlet port, a drain port, a brake port, a booster chamber communicatable with the pump via the inlet port and a master chamber communicatable with the brake actuator via the brake port, the master chamber selectively connectable to the pump to receive working fluid therefrom; a valve spool slidably fitted in the valve body through the booster chamber and the master chamber for extending and retracting movement with respect to the valve body, the valve spool shiftable between an idle position and an operating position; and slider means axially displaceably fitted to and movable together with the valve spool for, in response to the shifting movement of the valve spool into the operating position, decreasing the volume of the master chamber so that the fluid present in the master chamber can be extruded into the brake actuator via the brake port.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

Figure 1:
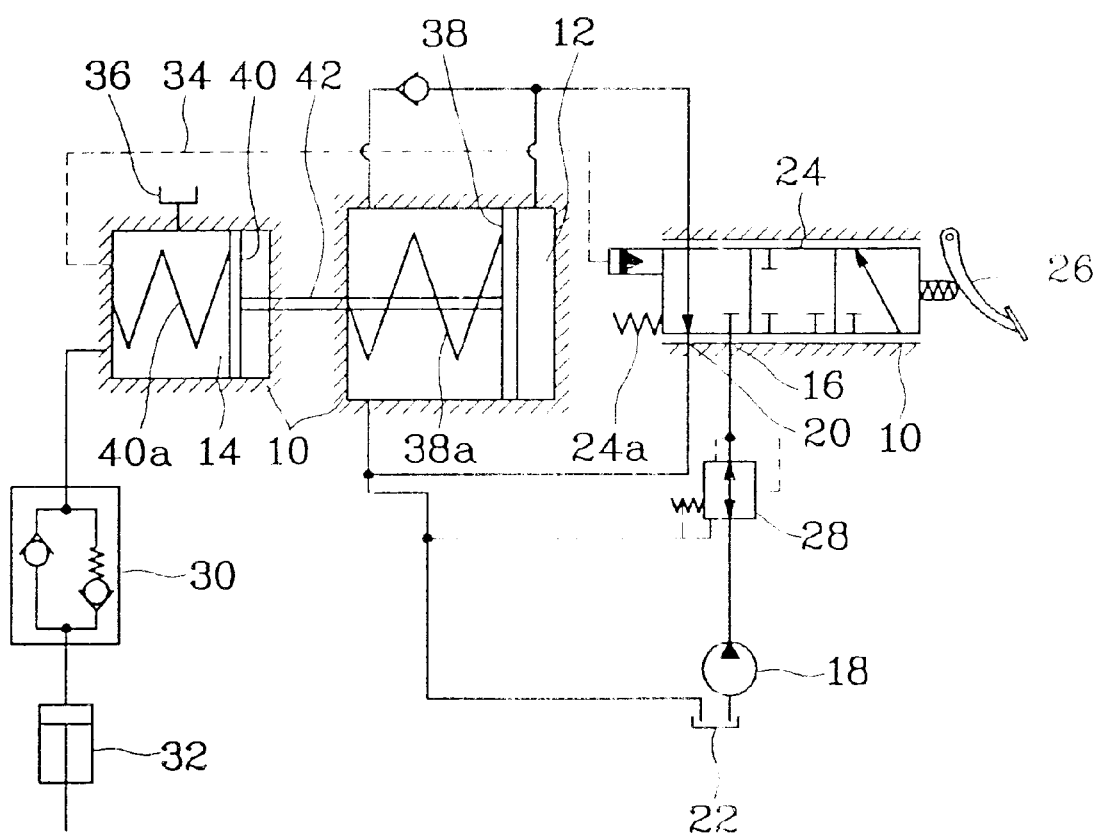
FIG. 1 is a hydraulic circuit diagram showing a conventional spool-in type booster brake valve device.
Figure 2:
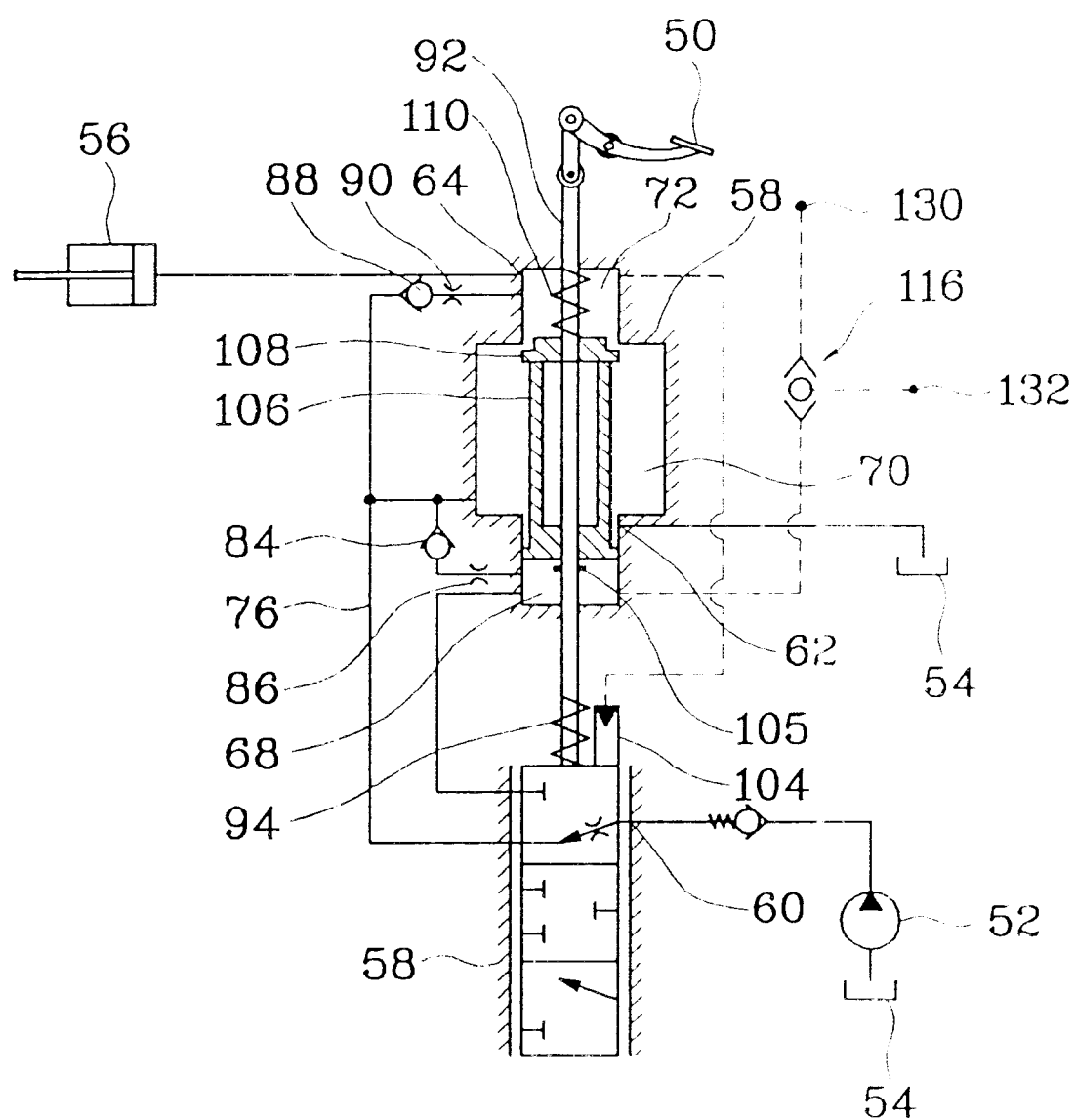
FIG. 2 is a hydraulic circuit diagram of a spool-out type booster brake valve device according to the present invention, illustrating a valve spool kept at its idle position.
Figure 3:
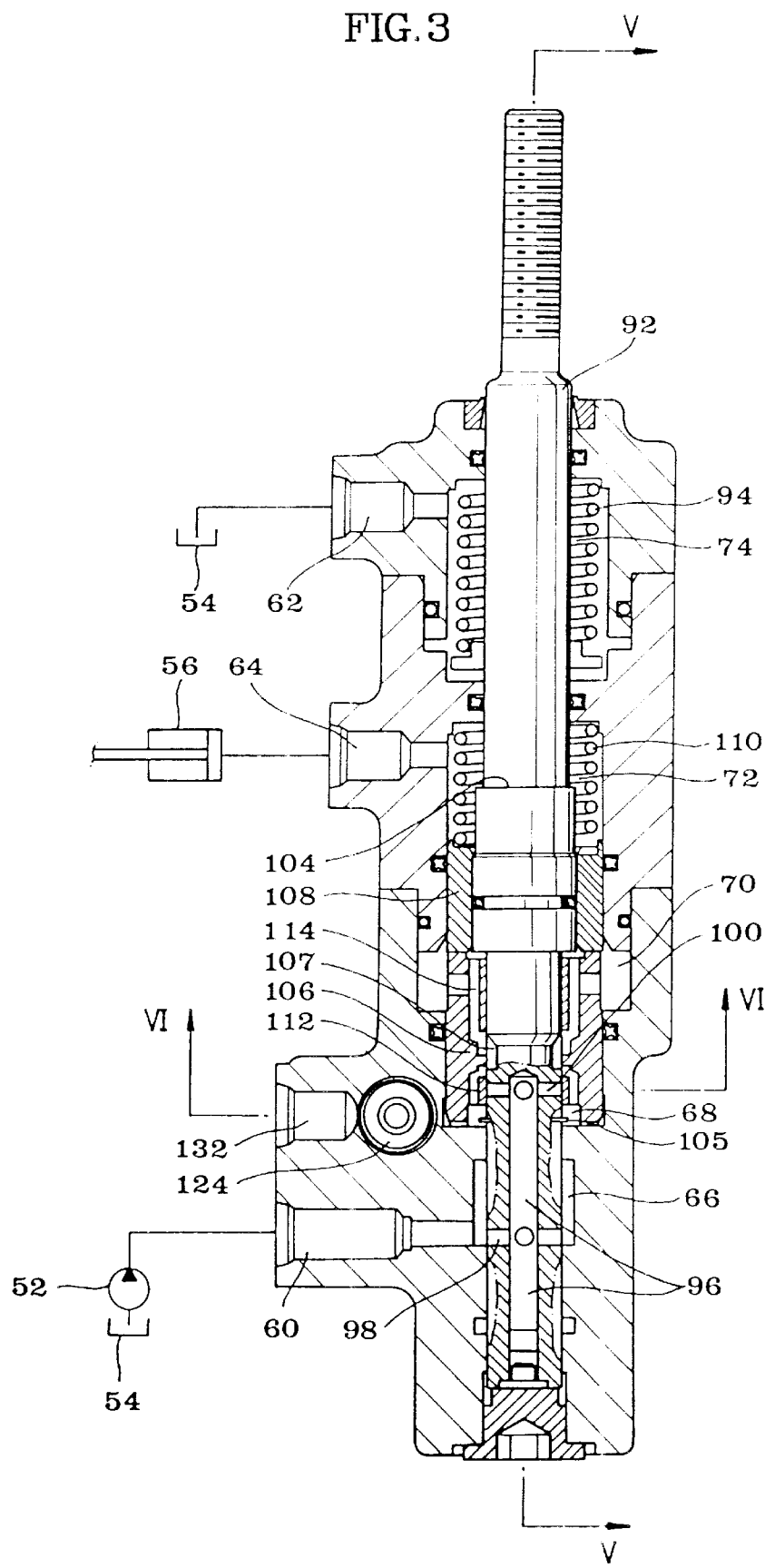
FIG. 3 is a sectional view illustrating the configuration of the brake valve device according to the present invention, with the valve spool remaining at its idle position.

Referring now to FIGS. 2 through 6, a brake valve device according to the invention is illustrated which may be advantageously used in such industrial vehicles as forklift trucks, excavators and loaders. The brake valve device is operatively connected to a brake pedal 50, a fluid pump 52, a reservoir tank 54 and a brake actuator 56 provided in the industrial vehicles. A valve body 58 is one of the essential elements of the brake valve device and is provided with an inlet port 60 communicating with the fluid pump 52, a drain port 62 communicating with the reservoir tank 54, and a brake port 64 communicating with the brake actuator 56. The valve body 58 is also defined with an inlet chamber 66, a booster chamber 68, a drain chamber 70, a master chamber 72 and a working fluid fill-up chamber 74 arranged one above another in the named order. As best shown in FIG. 3, the inlet chamber 66 communicates with the pump 52 through the inlet port 60, the master chamber 72 communicates with the brake actuator 56 through the brake port 64, and the working fluid fill-up chamber 74 communicates with the reservoir tank 54 through the drain port 62.

Figure 5:
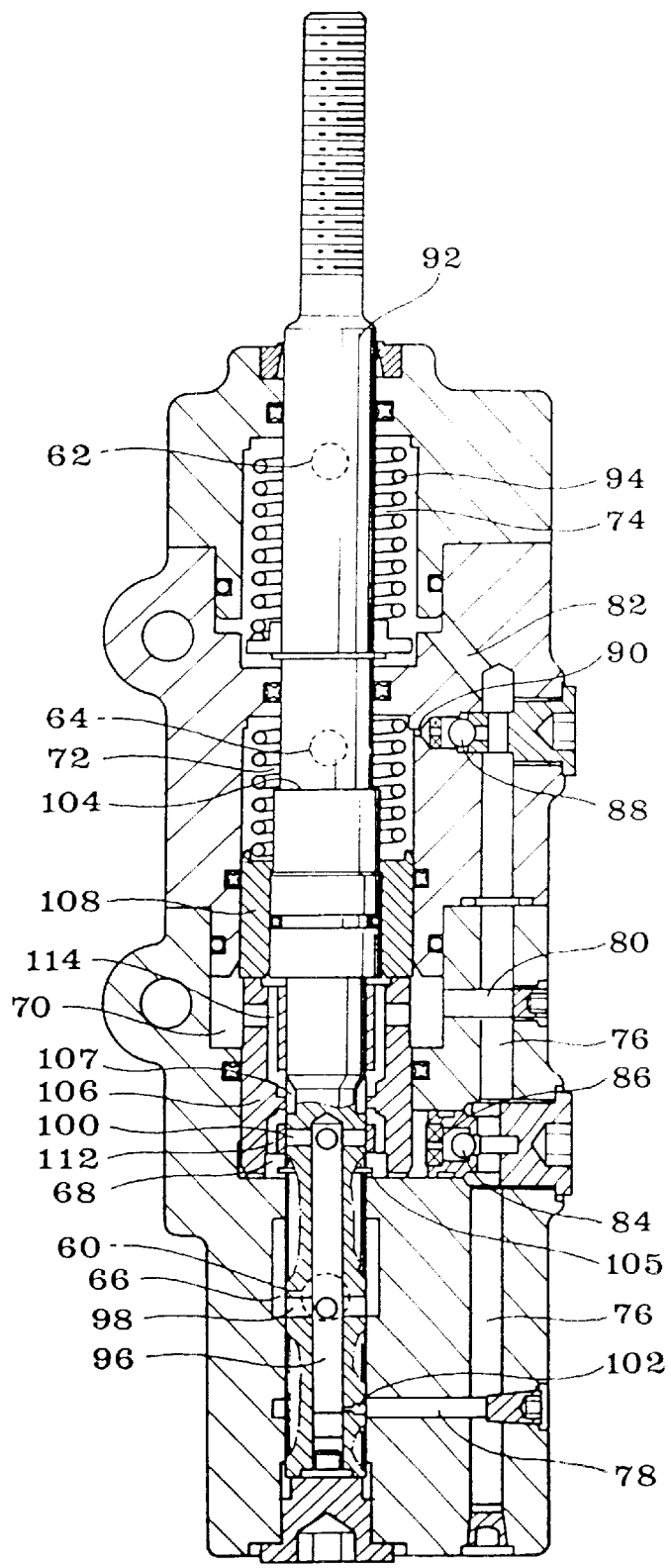
FIG. 5 is a cross-sectional view taken along line V—V in FIG. 3, best illustrating a booster chamber, a master chamber, an inlet chamber, a drain chamber and a working fluid fill-up chamber, all being in fluid communication with one another via a side fluid passageway.

With reference to FIG. 5, the valve body 58 has an elongated side fluid passageway 76. This side fluid passageway 76 is kept in communication with the inlet chamber 66 through a lower communication hole 78 to receive the working fluid from the pump 52 while no braking operation is carried out. During the course of braking operation, however, the side fluid passageway 76 is shut off from the inlet chamber 66. The side fluid passageway 76 continues to be in fluid communication with the drain chamber 70 through an intermediate communication hole 80 and with the working fluid fill-up chamber 74 through an upper communication hole 82. One of the important features of the invention is that the side fluid passageway 76 communicates with the booster chamber 68 via a booster check valve 84 and a booster orifice 86 and at the same time with the master chamber 72 via a master check valve 88 and a master orifice 90. In accordance with such configuration, the working fluid in the side fluid passageway 76 is allowed to enter the booster chamber 68 or the master chamber 72 but effluence of the fluid therefrom is prohibited by the booster check valve 84 or the master check valve 88.

An elongated valve spool 92 is slidably fitted in the valve body 58. This valve spool 92 is coupled to the brake pedal 50 via a link mechanism, as clearly shown in FIG. 2. The valve spool 92 is normally urged toward an idle position by a return spring 94 retained in the working fluid fill-up chamber 74, as illustrated in FIGS. 2 and 3. In the event that the brake pedal 50 is depressed, the valve spool 92 extends outwardly from the valve body 58 against the biasing force of the return spring 94 to assume an operating position thereof, in which means the brake valve device of the invention is called "spool-out type". It should be however noted that the present invention is not limited to the spool-out type device but may be applied to spool-in type brake valve devices wherein a valve spool is designed to slide into a valve body upon depression of a brake pedal.

As shown in FIGS. 3 to 6, the valve spool 92 has an axially extending central fluid passageway 96 formed at an inner end portion of the valve spool 92, a radially extending introduction hole 98 permanently connected to the inlet chamber 66, a radially extending discharge hole 100 selectively connected to the booster chamber 68 in response to axial displacement of the valve spool 92, and a bypass orifice 102 (see FIG. 5) connected to the side fluid passageway 76 and adapted to discharge working fluid supplied from the inlet chamber 66 to the side fluid passageway 76 via the lower communication hole 78 of the valve body 58 while the valve spool 92 is at its idle position. The valve spool 92 is provided with a shoulder 104 at its portion running through the master chamber 72. The shoulder 104 serves as a pressure receiving surface which receives hydraulic pressure axially exerting in the master chamber 72 during the braking operation to thereby urge the valve spool 92 toward the idle position. This assures that the driver can feel reaction force through the brake pedal 50 in the process of the braking operation. A snap ring 105 is fitted to the portion of the valve spool 92 which runs in the booster chamber 68. The valve spool 92 is also provided with an annular notch 107 at the outer peripheral surface thereof between the booster chamber 68 and the drain chamber 70. The snap ring 105 plays its role when manual braking operation is performed under emergency condition where no working fluid is supplied from the pump 52.

The booster chamber 68 and the master chamber 72 are isolated from each other by a booster sleeve 106 and a master piston 108 axially slidably fitted on the outer peripheral surface of the valve spool 92 in an end-to-end relationship with each other. Although the booster sleeve 106 and the master piston 108 are physically disconnected from each other in the illustrated embodiment, they may be integrally formed without departing from the scope of the present invention. Normally, both the booster sleeve 106 and the master piston 108 are resiliently urged toward the retracted position thereof by a return spring 110. Only when the hydraulic pressure in the booster chamber 68 becomes greater than the biasing force of the return spring 110, the booster sleeve 106 and the master piston 108 move toward the extended position thereof to reduce the volume of the master chamber 72, thereby causing the brake fluid in the master chamber 72 to be extruded into the brake actuator 56 via the brake port 64.

Figure 4:
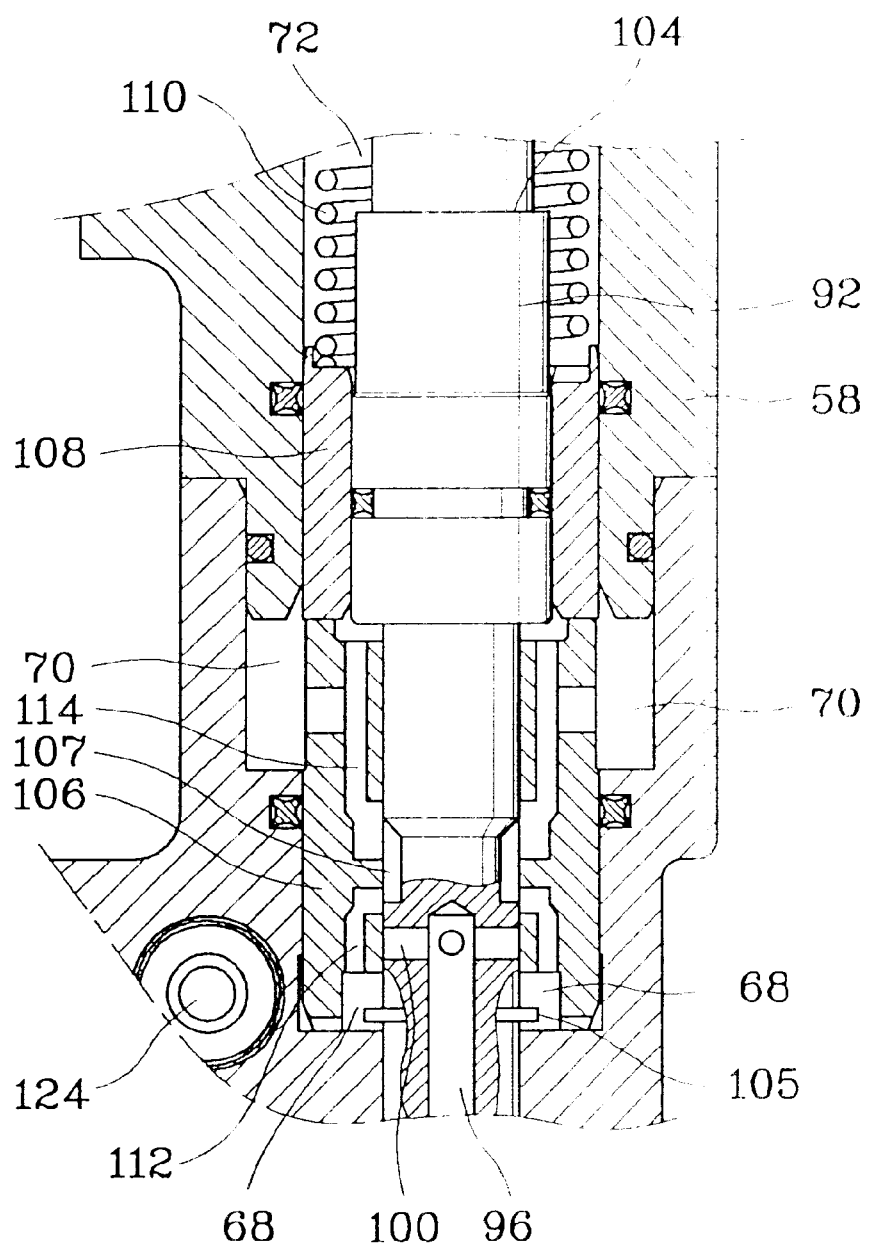
FIG. 4 is a partially-broken enlarged sectional view best illustrating a booster sleeve and a master piston slidably fitted on the valve spool between a booster chamber and a master chamber.

As best shown in FIG. 4, the booster sleeve 106 has a first sleeve passage 112 for selectively bringing the booster chamber 68 into communication with the radial discharge hole 100 and hence the central fluid passageway 96 of the valve spool 92 depending on the position of the booster sleeve 106 with respect to the valve spool 92, and a second sleeve passage 114 for selectively bringing the booster chamber 68 into communication with the drain chamber 70 and hence the side fluid passageway 76 in accordance with the position of the booster sleeve 106 with respect to the valve spool 92. When the first sleeve passage 112 of the booster sleeve 106 communicates with the radial discharge hole 100 of the valve spool 92, the high pressure working fluid discharged from the pump 52 is introduced into the booster chamber 68. On the other hand, when the first sleeve passage 112 of the booster sleeve 106 communicates with the notch 107 of the valve spool 92, the working fluid in the booster chamber 68 is discharged into the drain chamber 70 via the first sleeve passage 112 of the booster sleeve 106, the notch 107 of the valve spool 92 and the second sleeve passage 114 of the booster sleeve 106. In order to reduce the horse power of the pump 52 required to obtain a desired braking effect, the pressure of the working fluid supplied to the booster chamber 68 should be maintained as low as possible. To this end, the booster sleeve 106 is designed to have a fluid pressure receiving area larger than that of the master piston 108.

Figure 6:
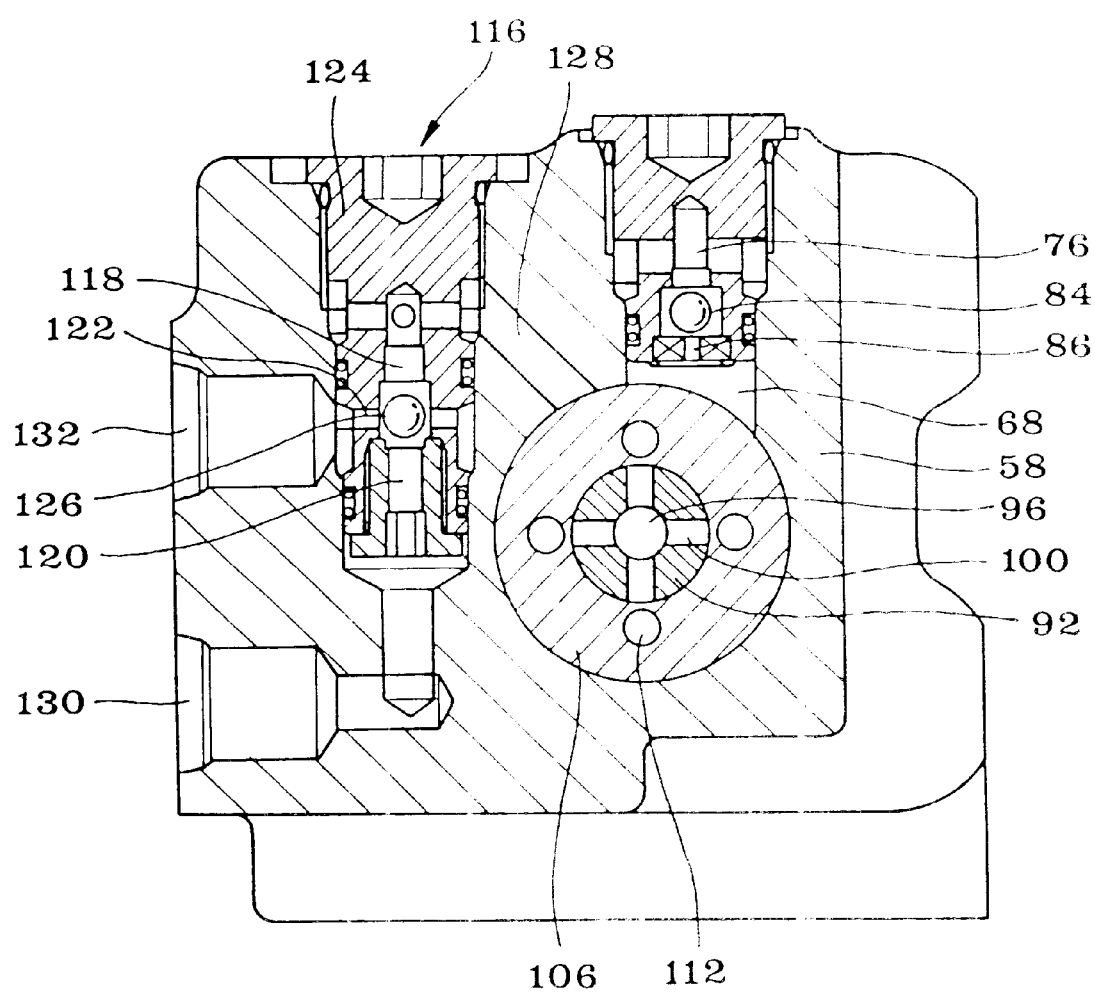
FIG. 6 is a cross-sectional view taken along line VI—VI in FIG. 3, best illustrating a shuttle valve whose function is to direct hydraulic fluid from a brake signal port or a steering signal port to a priority signal port.

Referring to FIGS. 2 and 6, it can be appreciated that the valve body 58 also has a plug 124 defined with first through third fluid passages 118, 120 and 122, and a shuttle valve 116 provided with a shuttle ball 126 received in the plug 124. The first fluid passage 118 of the shuttle valve 116 communicates with the booster chamber 68 via a brake signal port 128. The second fluid passage 120 communicates with a steering signal port 130 whereas the third fluid passage 122 communicates with a priority signal port 132. As the hydraulic pressure in the booster chamber 68 increases during the braking operation, the working fluid in the booster chamber 68 is partially introduced into the shuttle valve 116 via the brake signal port 128 and the first fluid passage 118, thereby causing the shuttle ball 126 to move toward and close off the second fluid passage 120. In this state, the working fluid is delivered to a priority valve (not shown) via the priority signal port 132, assuring that the priority valve preferentially supplies the working fluid discharged from the pump 52 to the brake valve device for the sake of stabilized brake operation. Meanwhile, when the working fluid enters the shuttle valve 116 via the steering signal port 130 and the third fluid passage 120 during the course of steering operation of the vehicle, the shuttle ball 126 is shifted toward the first fluid passage 118, thereby closing off the latter. As a result, the working fluid is fed to the priority valve via the priority signal port 132. This allows the priority valve to feed the working fluid discharged from the pump 52 preferentially to a steering device(not shown) so that the steering operation can be stably carried out.

The operation of the brake valve device for industrial vehicles according to the present invention will now be described in detail, mainly in conjunction with FIGS. 3 to 5 and FIGS. 7 to 11.

Under the state that the brake pedal 50 is not depressed, the valve spool 92 is resiliently urged into the idle position by virtue of the biasing force of the return spring 92 applied thereto. Also, the booster sleeve 106 and the master piston 108 are resiliently pushed into the retracted position thereof by virtue of the biasing force of the return spring 110. The high pressure working fluid discharged from the pump 52 is supplied to the central fluid passageway 96 of the valve spool 92 via the inlet port 60 and the inlet chamber 66 of the valve body 58, and will then be fed to the side fluid passageway 76 of the valve body 58 via the bypass orifice 102, as shown in FIG. 5. The reason why the working fluid is continuously discharged into the side fluid passageway 76 at a low flow rate via the bypass orifice 102 while no braking operation is conducted is to ensure that a sufficient amount of working fluid be supplied to the working implements of the vehicle.

The working fluid introduced in the side fluid passageway 76 is fed to the booster chamber 68 via the booster check valve 84 and the booster orifice 86 to fill the booster chamber 68 while being fed to the master chamber 72 via the master check valve 88 and the master orifice 90 to fill the master chamber 72. Thereafter, the working fluid introduced in the side fluid passageway 76 enters the working fluid fill-up chamber 74. The working fluid overflowing the fluid fill-up chamber 74 returns to the reservoir tank 54 via the drain port 62, as shown in FIG. 3.

If the brake valve device is configured such that the working fluid discharged from the pump 52 fills up the master chamber 72, as mentioned above, there would be no need to employ any separate tank and attendant hydraulic line for supplementing brake fluid in the master chamber 72. Positioning the fluid fill-up chamber 74 at the uppermost portion of the valve body 58 as in the illustrated embodiment makes sure that the working fluid in the fluid fill-up chamber 74 can flow downwardly under the action of gravity to fill the master chamber 72 even in an emergency situation such as breakdown of the pump. Accordingly, it becomes possible to avoid a dangerous situation such as the loss of braking effect which would otherwise take place due to the shortage of the brake fluid.

Figure 7:
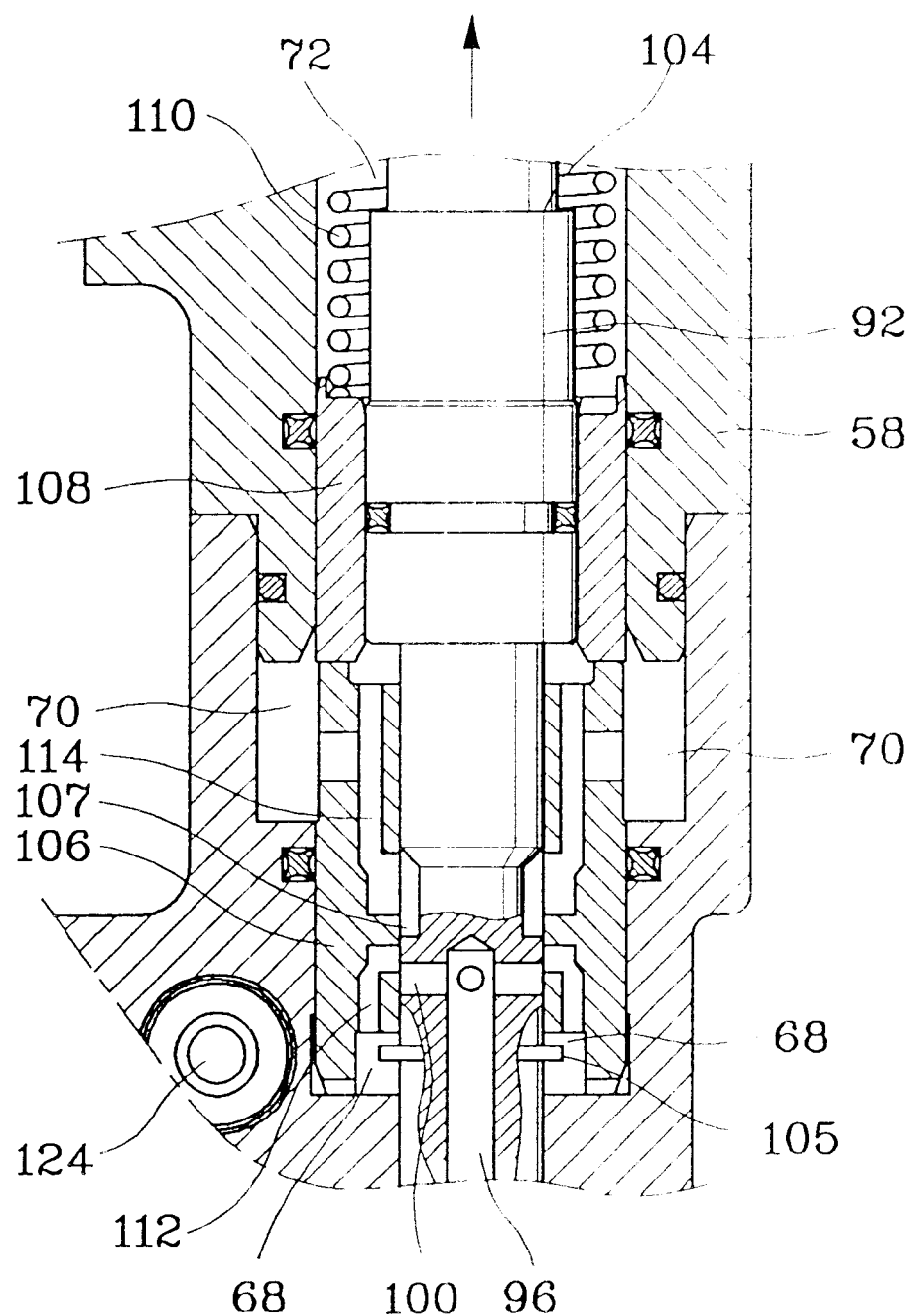
FIG. 7 is a view similar to FIG. 4 but illustrating a first stage operation of the brake valve device wherein the valve spool is upwardly moved in response to the depression of the brake pedal, thereby causing the working fluid to be introduced into the booster chamber.

As the driver of the vehicle depresses the brake pedal 50, the valve spool 92 is outwardly pulled from the valve body 58 against the biasing force of the return spring 94, so that it can move from the idle position shown in FIGS. 3 to 5 to the operating position shown in FIG. 7. Accordingly, the radial discharge hole 100 of the valve spool 92 is rendered to communicate with the first sleeve passage 112 of the booster sleeve 106, with the result that the high pressure working fluid in the central fluid passageway 96 of the valve spool 92 is introduced into the booster chamber 68 via the radial discharge hole 100 and the first sleeve passage 112. At this time, the bypass orifice 102 of the valve spool 92 shown in FIG. 5 is closed off so that no working fluid is fed to the side fluid passageway 76. The working fluid introduced in the booster chamber 68 is partially delivered to the priority signal port 132 via the brake signal port 128 and the shuttle valve 116. As a result, the priority valve (not shown) supplies the working fluid discharged from the pump 52 preferentially to the inlet port 60 of the brake valve device.

Figure 8:
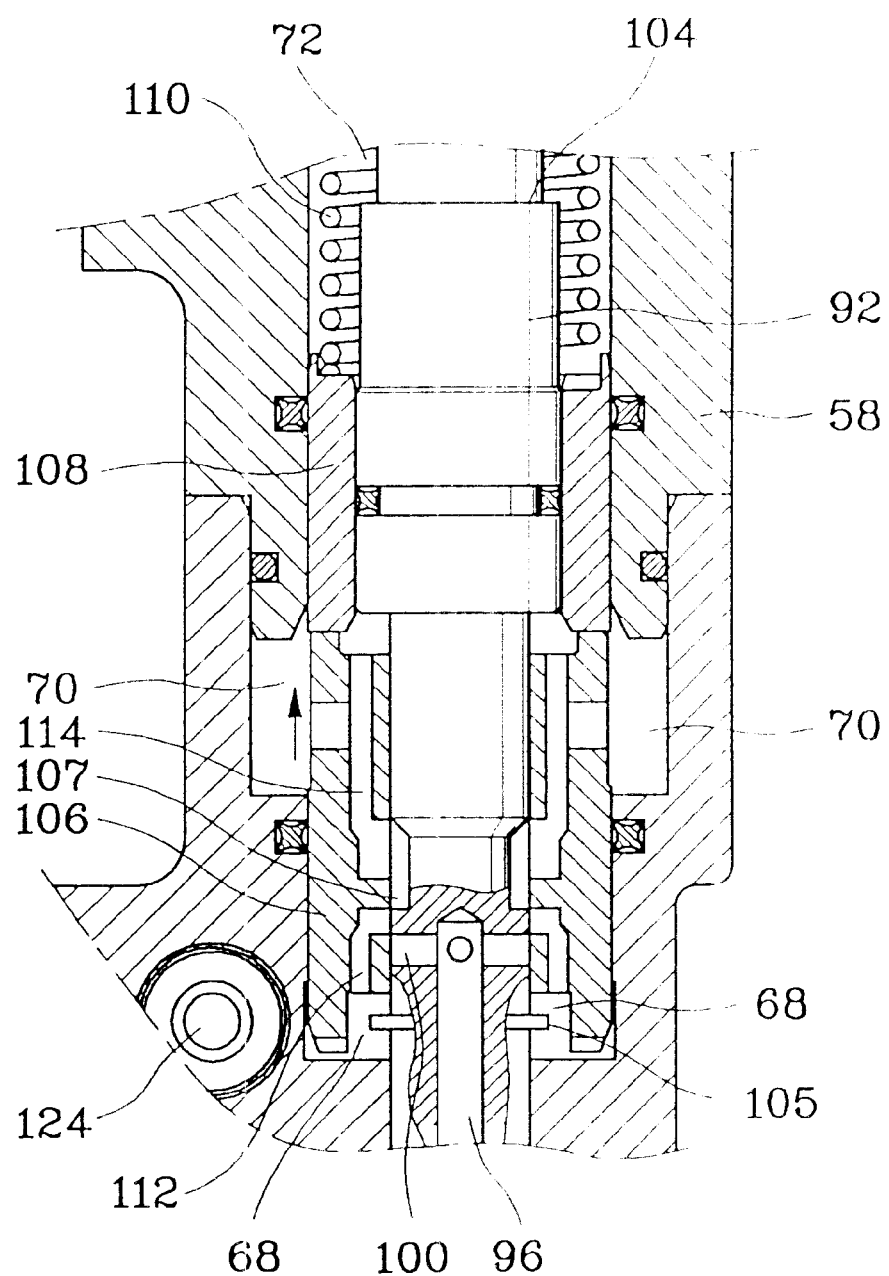
FIG. 8 is a view similar to FIG. 7 but illustrating a second stage operation of the brake valve device in which the booster sleeve and the master piston are upwardly extended by virtue of the hydraulic pressure of the working fluid introduced in the booster chamber, thereby causing the brake fluid in the master chamber to be extruded into a brake actuator.

When the hydraulic pressure in the booster chamber 68 becomes great enough to overcome the biasing force of the return spring 110, the booster sleeve 106 and the master piston 108 are upwardly moved toward the master chamber 72 along the valve spool 92 against the biasing force of the return spring 110, as shown in FIG. 8. This causes the volume of the master chamber 72 to be decreased gradually, thus causing the brake fluid in the master chamber 72 to be extruded into the brake actuator 56, whereby the desired braking operation takes place. Meanwhile, the hydraulic pressure exerting in the master chamber 72 during the above mentioned braking operation tends to push the shoulder 104 of the valve spool 92 against the extending movement of the valve spool 92. By virtue of such reaction force, the vehicle driver feels that the braking operation occurs in the desired manner.

Figure 9:
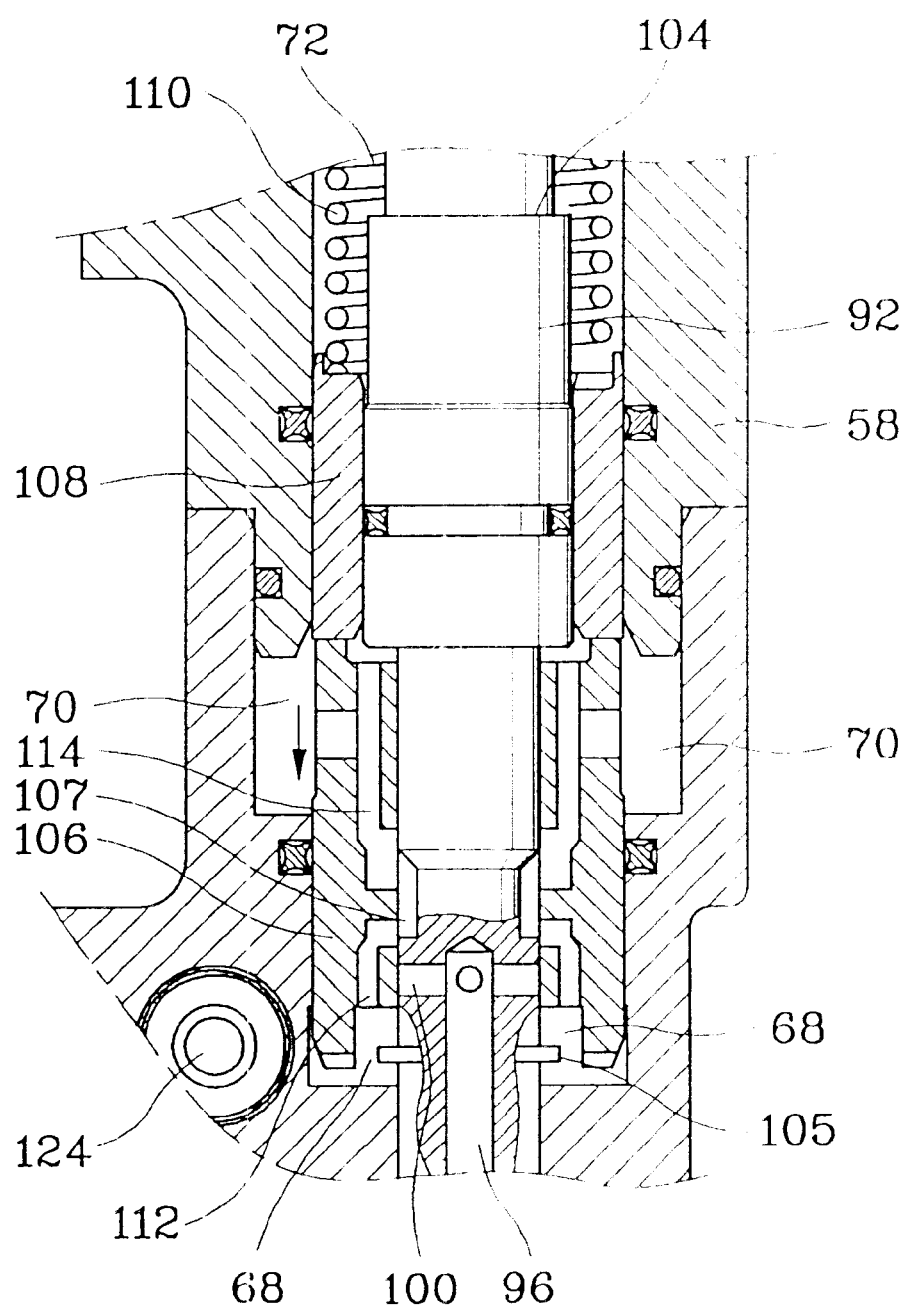
FIG. 9 is a view similar to FIG. 8 but illustrating a third stage operation of the brake valve device in which the working fluid in the booster chamber is discharged into the drain chamber due to the excessive extending movement of the booster sleeve and the master piston, thereby allowing the booster sleeve and the master piston to be retracted by virtue of the biasing force of a return spring.
Figure 10:
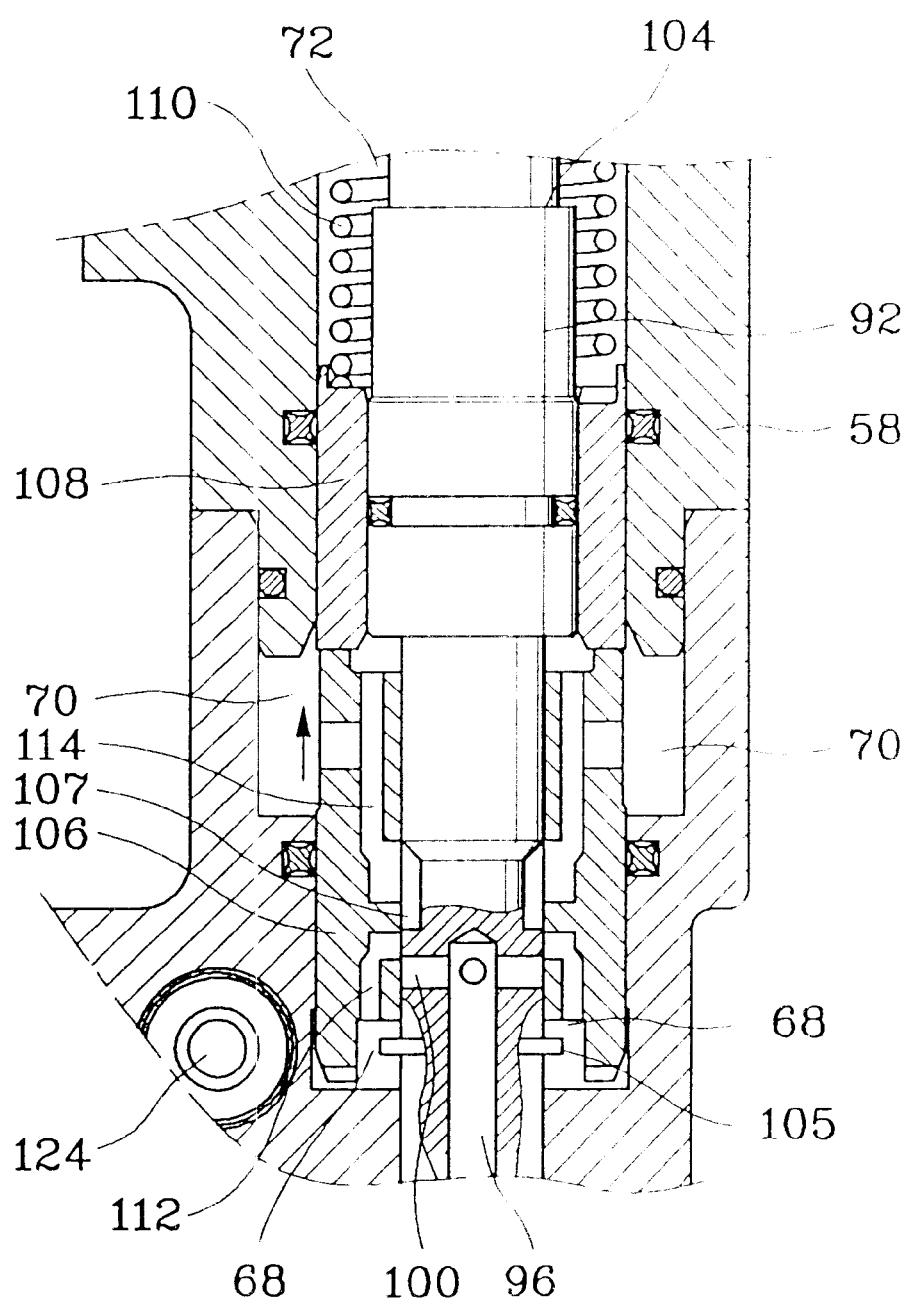
FIG. 10 is a view similar to FIG. 9 but illustrating a fourth stage operation of the brake valve device in which the working fluid is introduced again into the booster chamber due to the excessive retracting movement of the booster sleeve and the master piston, thereby causing the booster sleeve and the master piston to be extended again.
Figure 11:
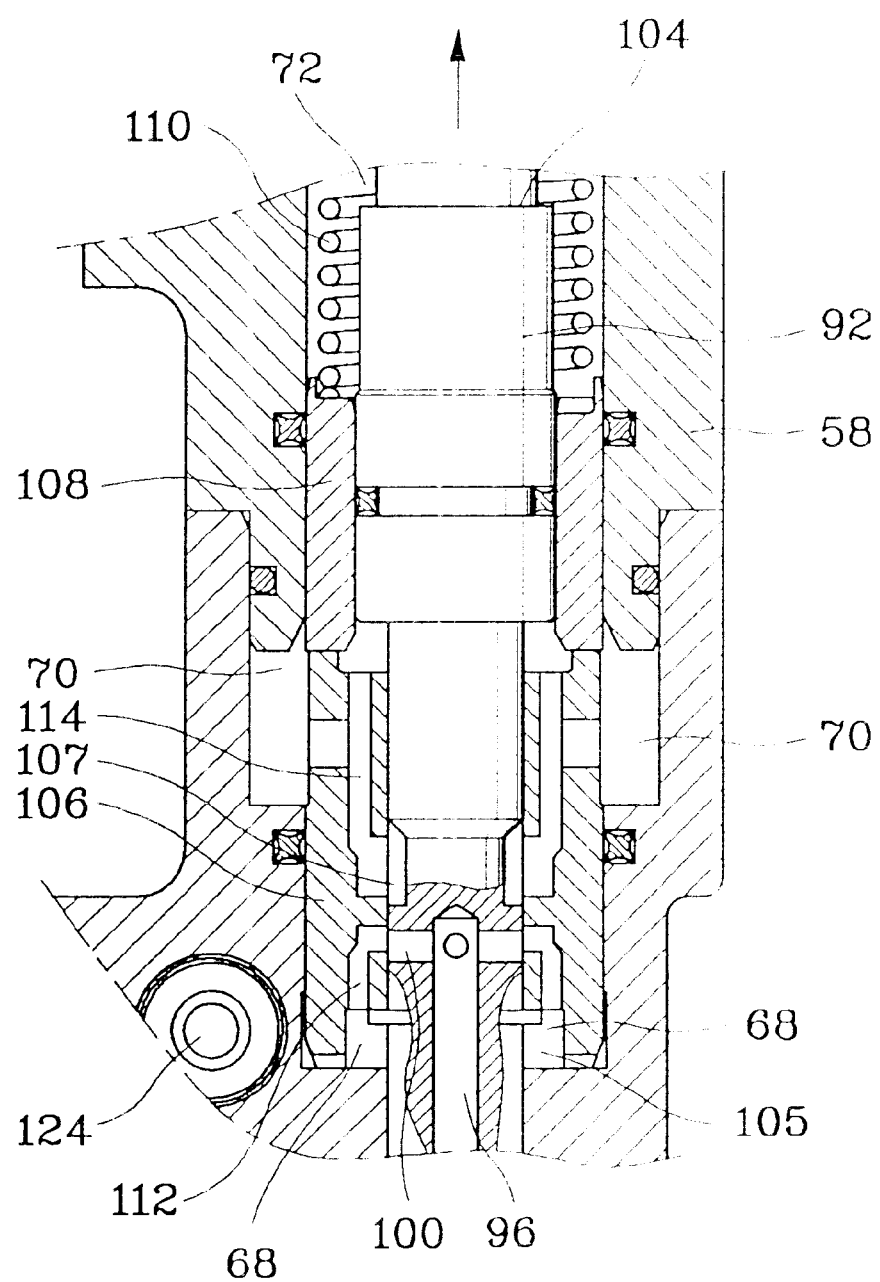
FIG. 11 is a view similar to FIG. 4 but illustrating a manual mode operation in which a snap ring of the valve spool comes into engagement with the lower end of the booster sleeve so that the booster sleeve and the master piston can be moved upwards together with the valve spool.

If the booster sleeve 106nd the master piston 108 are moved to the position shown in FIG. 9, the first sleeve passage 112 of the booster sleeve 106 is shut off from the radial discharge hole 100 of the valve spool 92. At the same moment, the working fluid in the booster chamber 68 is discharged into the drain chamber 70 via the first sleeve passage 112 of the booster sleeve 106, the notch 107 of the valve spool 92, and the second sleeve passage 114 of the booster sleeve 106, in the named order. This allows the booster sleeve 106 the and master piston 108 to be downwardly moved by virtue of the biasing force of the return spring 110. If the booster sleeve 106 reaches the position indicated in FIG. 10 as a result of the continued downward movement thereof, the first sleeve passage 112 of the booster sleeve 106 is rendered to communicate again with the radial discharge hole 100 of the valve spool 92. Accordingly, the working fluid in the central fluid passageway 96 is introduced again into the booster chamber 68 to push the booster sleeve 106 and the master piston 108 upwardly. By way of such "damping" procedures, the booster sleeve 106 and the master piston 108 are moved by the same distance as that of the valve spool 92. Accordingly, the brake fluid in the master chamber 72 is extruded into the brake actuator 56 in an amount proportional to the displacement of the booster sleeve 106 and the master piston 108 in order to obtain a desired vehicle braking effect. As soon as the driver removes the depression force from the brake pedal 50, the valve spool 92 returns to its idle position shown in FIGS. 3 to 5 by virtue of the biasing force of the return spring 94. At the same time, the booster sleeve 106 and the master piston 108 are returned back to the retracted position thereof by the return spring 110.

In an emergency situation where no working fluid is supplied from the pump 52 due to, for example, a stoppage of the engine of the vehicle, it is impossible to introduce the working fluid into the booster chamber 68 even though the valve spool 92 is moved from the idle position to the operating position by depressing the brake pedal 50. In this state, the booster sleeve 106 and the master piston 108 are maintained at the retracted position under the biasing force of the return spring 110. If the brake pedal 50 is deeply depressed, the snap ring 105 of the valve spool 92 comes into contact with the lower end of the booster sleeve 106, assuring that the booster sleeve 106 and the master piston 108 are upwardly moved together with the valve spool 92. This reduces the volume of the master chamber 72, thereby causing the brake fluid in the master chamber 72 to be extruded into the brake actuator 56. In such a manual brake mode, the braking effect is obtained only by the depression force applied to the brake pedal 50. This means that an increased pedal depression force is required in the manual mode as compared to the above-mentioned power mode.

Although the preferred embodiments of the invention have been disclosed for illustrative purposes, those skilled in the art will appreciate that various modifications, additions and substitutions are possible without departing from the scope and spirit of the invention as set forth in the accompanying claims.

What is claimed is:

1. A brake valve device for use in industrial vehicles equipped with a fluid pump, a reservoir tank and a brake actuator, comprising:

a valve body having an inlet port, a drain port, a brake port, a side fluid passageway adapted to bring the inlet port in communication with the drain port, a booster chamber communicatable with the pump via the inlet port, and a master chamber communicatable with the brake actuator via the brake port, the master chamber connected to the inlet port to receive working fluid from the pump;

a master check valve for allowing the working fluid to be introduced from the side fluid passageway into the master chamber while preventing the working fluid from being discharged from the master chamber to the side fluid passageway;

a valve spool slidably fitted in the valve body through the booster chamber and the master chamber for movement between an idle position and an operating position; and a slider reducing the volume of the master chamber in response to the shifting movement of the valve spool into the operating position so that the fluid in the master chamber is extruded into the brake actuator via the brake port.

2. The brake valve device according to claim 1, wherein the valve spool has a central fluid passageway remaining in communication with the inlet port of the valve body, the central fluid passageway communicating with the side fluid passageway when the valve spool is at the idle position but coming into communication with the booster chamber upon the shift of the valve spool into the operating position.

3. The brake valve device according to claim 2, wherein the valve spool further has a bypass orifice adapted to bring the central fluid passageway into communication with the side fluid passageway.

4. The brake valve device according to claim 2, wherein the slider comprises a booster sleeve and a master piston, the booster sleeve having a first sleeve passage for selectively bringing the booster chamber into communication with the central fluid passageway of the valve spool and a second sleeve passage for selectively bringing the booster chamber into communication with the side fluid passageway.

5. The brake valve device according to claim 1, wherein the valve body is further provided with a working fluid fill-up chamber arranged at a higher elevation than the booster chamber and the master chamber.

6. The brake valve device according to claim 1, wherein the valve body further has a booster check valve for allowing the working fluid to be introduced from the side fluid passageway into the booster chamber while preventing the working fluid from being discharged from the booster chamber to the side fluid passageway.

7. A brake valve device for use in industrial vehicles equipped with a fluid pump, a reservoir tank and a brake actuator, comprising:
   a valve body having an inlet port, a drain port, a brake port, a booster chamber communicatable with the pump via the inlet port, and a master chamber communicatable with the brake actuator via the brake port;
   means for allowing working fluid discharged from the pump to be introduced into the master chamber of the valve body but preventing effluence of the fluid out of the master chamber, the allowing means comprising a master orifice bringing the master chamber into communication with the inlet port and a master check valve provided in the master orifice;
   a valve spool slidably fitted in the valve body for movement between an idle position and an operating position; and
   a slider provided between the booster chamber and the master chamber for reducing the volume of the master chamber in response to the shifting movement of the valve spool into the operating position so that the fluid in the master chamber can be extruded into the brake actuator via the brake port.

8. The brake valve device according to claim 7, wherein the slider comprises a booster sleeve and a master piston axially slidably fitted on the valve spool between the booster chamber and the master chamber in an end-to-end relationship with each other.

9. A brake valve device for use in industrial vehicles equipped with a fluid pump, a reservoir tank and a brake actuator, comprising:
   a valve body having an inlet port, a drain port, a brake port, a booster chamber communicatable with the pump via the inlet port, and a master chamber communicatable with the brake actuator via the brake port, the master chamber connected to the inlet port to receive working fluid from the pump;
   a valve spool slidably fitted in the valve body through the booster chamber and the master chamber for movement between an idle position and an operating position, the valve spool having a snap ring adapted to engage with the slider to cause the slider to be forcibly moved toward the master chamber along with the valve spool as the valve spool is moved into the operating position with no working fluid supplied from the pump; and
   a slider for reducing the volume of the master chamber in response to the shifting movement of the valve spool into the operating position so that the fluid in the master chamber can be extruded into the brake actuator via the brake port.

* * * * *